US008165637B2

(12) United States Patent
Park et al.

(10) Patent No.: US 8,165,637 B2
(45) Date of Patent: Apr. 24, 2012

(54) MULTIPLE INPUT MULTIPLE OUTPUT (MIMO) ANTENNA SYSTEM ADAPTABLE FOR ENVIRONMENTAL MULTIPLICITY

(75) Inventors: Se-hyun Park, Suwon-si (KR); Byung-tae Yoon, Suwon-si (KR); Young-min Moon, Seoul (KR); Dong-jin Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 941 days.

(21) Appl. No.: 12/099,734

(22) Filed: Apr. 8, 2008

(65) Prior Publication Data

US 2009/0051618 A1 Feb. 26, 2009

(30) Foreign Application Priority Data

Aug. 22, 2007 (KR) ........................ 10-2007-0084533

(51) Int. Cl.
*H04M 1/00* (2006.01)

(52) U.S. Cl. ............... 455/562.1; 455/67.11; 455/67.13; 455/561; 455/575.7; 455/133; 455/134; 455/277.1; 455/277.2

(58) Field of Classification Search .......... 455/132–139, 455/272–277.2, 83, 561, 67.16, 67.11, 562.1, 455/575.7, 277.1; 375/267, 132, 315, 150, 375/349; 370/329
See application file for complete search history.

(56) References Cited

U.S. PATENT DOCUMENTS

| | | | | | |
|---|---|---|---|---|---|
| H1033 | H * | 3/1992 | Willey et al. | ... | 342/17 |
| 5,375,257 | A * | 12/1994 | Lampen | ... | 455/83 |
| 6,411,824 | B1 * | 6/2002 | Eidson | ... | 455/561 |
| 6,963,619 | B1 * | 11/2005 | Gesbert et al. | ... | 375/267 |
| 7,277,731 | B2 * | 10/2007 | Stratis et al. | ... | 455/562.1 |
| 2002/0118724 | A1 * | 8/2002 | Kishimoto et al. | ... | 375/132 |
| 2005/0242992 | A1 * | 11/2005 | Tomasic et al. | ... | 342/368 |
| 2008/0102812 | A1 * | 5/2008 | Chari et al. | ... | 455/424 |
| 2008/0181174 | A1 * | 7/2008 | Cho | ... | 370/329 |

FOREIGN PATENT DOCUMENTS

KR 10-2005-0075967 7/2005

* cited by examiner

*Primary Examiner* — Junpeng Chen
(74) *Attorney, Agent, or Firm* — NSIP Law

(57) ABSTRACT

A Multiple Input Multiple Output (MIMO) antenna system adaptable to an environmental multiplicity is provided. A MIMO antenna system includes a first antenna element, a second antenna element, a receiver for receiving at least one of different polarized signals through the first antenna element, a channel estimator for estimating a channel using a signal received via the receiver and a signal received via the second antenna element, and a correlation comparator for controlling the receiver to receive a specific polarized signal according to a correlation calculated from the estimated channel.

16 Claims, 6 Drawing Sheets

MULTIPLE INPUT MULTIPLE OUTPUT (MIMO) ANTENNA SYSTEM ADAPTABLE FOR ENVIRONMENTAL MULTIPLICITY

CROSS-REFERENCE TO RELATED APPLICATIONS

This application claims the benefit under 35 U.S.C. §119 (a) of a Korean Patent Application No. 2007-84533 filed on Aug. 22, 2007, in the Korean Intellectual Property Office, the entire disclosure of which is incorporated herein by reference.

TECHNICAL FIELD

The following description relates to a Multiple Input Multiple Output (MIMO) antenna. More particularly, the description relates to a MIMO antenna system for enhancing a reception efficiency in diverse environments.

BACKGROUND

In response to demands for high-quality multimedia services using a wireless mobile communication technology, a next-generation radio transmission technique is needed to send more data even faster in a lower error probability.

To this end, a Multiple Input Multiple Output (MIMO) antenna is suggested. The MIMO antenna performs a MIMO operation by arranging a plurality of antenna elements in a specific structure. Thus, the MIMO antenna can raise a data rate in a certain range or extend a system range at a specific data rate. The MIMO antenna, which is a next-generation mobile communication technique of wide applications in a mobile terminal or a repeater, is attracting attention as the advanced technique for overcoming limitations on the amount of the transmission data in the exiting mobile communications due to the extension of the data communications.

However, to install the plurality of the antenna elements within a small terminal, the MIMO antenna requires smaller antenna elements. It is difficult to implement such a small antenna element using the conventional antennas. Therefore, what is needed is smaller antenna elements for the MIMO system in accordance with the miniaturization of the terminal.

Further, when a signal is received on the MIMO antenna, the channel environment also changes according to the position of the MIMO antenna. Hence, it is difficult to recover the signal because of the inconstant Received Signal Strength Indication (RSSI) of the received signal. Particularly, a linearly polarized antenna is generally installed in the receiver to correspond to an antenna which sends the linear polarized wave. If the polarized wave changes in a multi-path environment, the receiver is subject to the loss in the RSSI.

As the receiver near the transmitter receives the signal of a high correlation, the MIMO antenna may not recover the signal.

SUMMARY

Accordingly, in one general aspect, there is provided a MIMO antenna system for receiving a polarized signal of different types based on diverse environmental changes and enhancing a restoration performance.

In another aspect, there is provided a MIMO antenna system including a first antenna element, a second antenna element, a receiver for receiving at least one of different polarized signals through the first antenna element, a channel estimator for estimating a channel using a signal received via the receiver and a signal received via the second antenna element, and a correlation comparator for controlling the receiver to receive a specific polarized signal according to a correlation calculated from the estimated channel.

Where the calculated correlation is greater than a threshold correlation, the correlation comparator may control the receiver to receive a polarized signal different from the signal pre-received at the receiver.

The receiver may include a power comparator for controlling to receive a specific polarized signal according to a Received Signal Strength Indication (RSSI) of the received signal.

The power comparator may control the receiver to receive a polarized signal different from the pre-received polarized signal when the RSSI of the received polarized signal is less than a threshold RSSI.

The receiver may include a first switch for receiving a first polarized signal; and a second switch for receiving a second polarized signal. The correlation comparator may control the receiver to receive one of the first polarized signal and the second polarized signal.

The correlation comparator may control the receiver to receive a polarized signal having a lower spatial correlation, among the first polarized signal and the second polarized signal.

A linearly polarized signal may resonate in the first antenna element.

The receiver may further include a first feeding line of which one end is connected to a first side of the first antenna element and the other end is connected to a feeder; and a second feeding line of which one end is connected to a second side, which is different from the first side, of the second antenna element and the other end is connected to the feeder. The first switch may be disposed in the first feeding line and the second switch is disposed in the second feeding line.

The one end of the first feeding line may be disposed at a center of the first side of the first antenna element.

The first polarized signal may be a vertically linear polarized wave and the second polarized signal may be a horizontally linear polarized wave.

The receiver may include a phase shifter for altering a phase of the signal received through the first antenna element; a first switch for selecting a first polarized signal; and a second switch for selecting a second polarized signal. The correlation comparator may control the first switch and the second switch to select a polarized signal of a lower correlation, among the first polarized signal and the second polarized signal.

A linearly polarized signal may resonate in the first antenna element.

The MIMO antenna system may further include a feeder for supplying a current to the first antenna element, wherein the receiver may include a first feeding line of which one end is connected to a first side of the first antenna element and the other end is connected to the feeder, and a second feeding line of which one end is connected to a second side, which is different from the first side, of the first antenna element and the other end is connected to the feeder. The first switch may be disposed in the first feeding line, the second switch is disposed in the second feeding line, and the phase shifter may be disposed between the first feeding line and the second feeding line.

The first polarized signal may be a left-handed circular polarized signal and the second polarized signal may be a right-handed circular polarized signal.

In still another aspect, a method for controlling a MIMO antenna system which comprises a first antenna element and a second antenna element, includes receiving a first signal which is at least one of different polarized signals, through the first antenna element, receiving a second signal through the second antenna element, estimating a channel using the first signal and the second signal, and firstly controlling to make the first signal be a specific polarized signal based on a correlation calculated from the estimated channel.

The firstly controlling operation may control to make the first signal be a polarized signal different from a pre-received signal when the calculated correlation is greater than a threshold correlation.

The receiving operation may include secondly controlling to make the first signal be a specific polarized signal according to a RSSI of the first signal.

The secondly controlling operation may control to make the first signal be a polarized signal different from a pre-received signal when the RSSI of the pre-received first signal is less than a threshold RSSI.

Other features will become apparent to those skilled in the art from the following detailed description, which, taken in conjunction with the attached drawings, discloses exemplary embodiments of the invention.

BRIEF DESCRIPTION OF THE DRAWING FIGURES

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
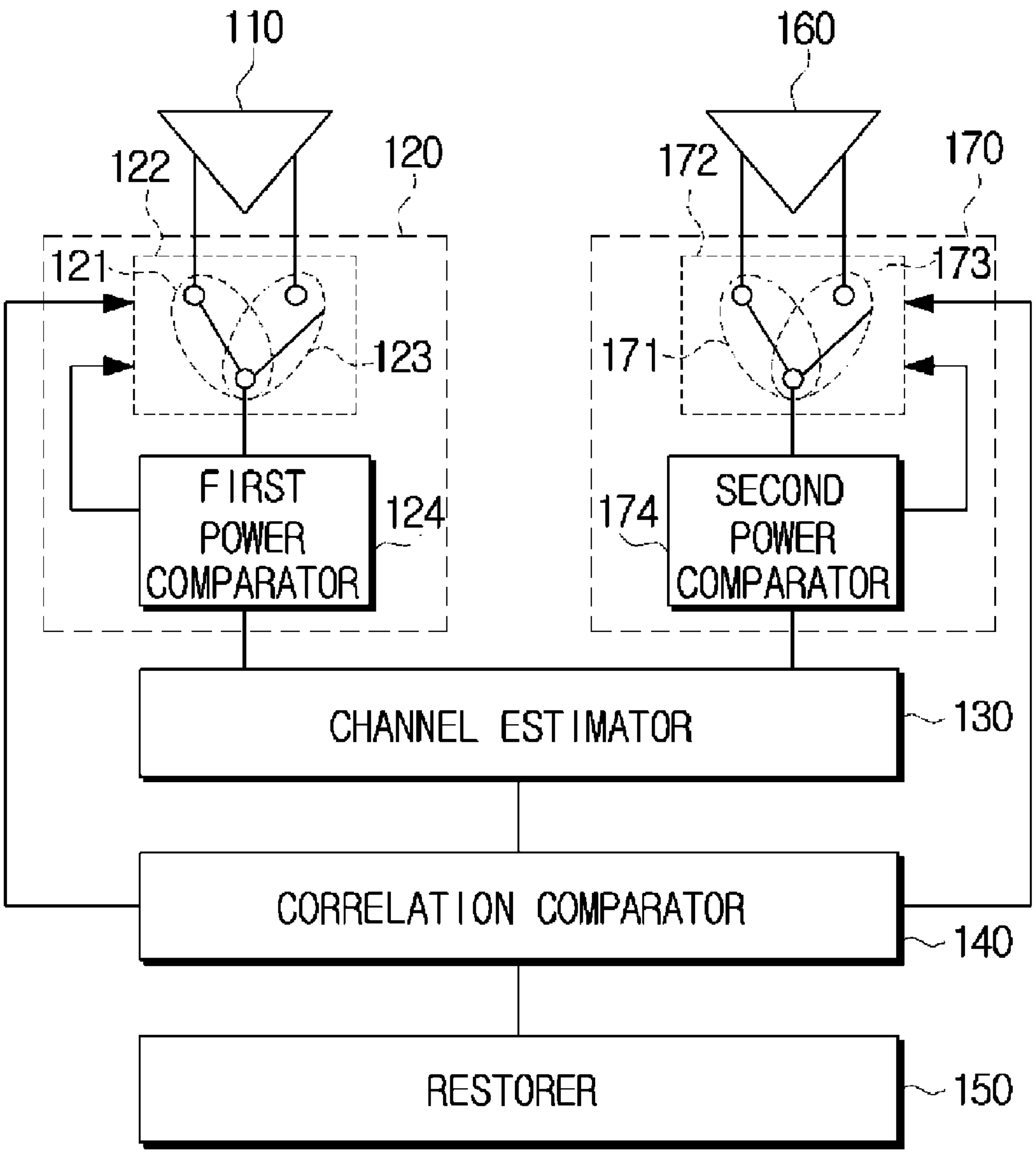
FIG. 1 is a block diagram of an antenna system for receiving and recovering one of various polarized signals according to an exemplary embodiment.

FIG. 1 is a block diagram of an antenna system for receiving and recovering one of various polarized signals according to an exemplary embodiment. The antenna system includes antenna elements 110 and 160 in which electromagnetic waves of specific frequency bands resonate, receivers 120 and 170 for receiving specific polarized waves by making the specific polarized waves resonate in the antenna elements 110 and 160, a channel estimator 130 for estimating a channel using signals received at the receiver 120 and 170, a correlation comparator 140 for comparing correlations using channel state information of a channel matrix, and a restorer 150 for restoring the received signals.

The antenna system is a MIMO antenna system. To ease the understanding, the MIMO antenna system including two antenna elements is illustrated.

According to an aspect, it may be desirable that the first antenna element 110 and the second antenna element 160 are implemented such that various polarized signals resonate. In more detail, the polarized signal resonating in the first antenna element 110 and the second antenna element 160 can include a linear polarized wave and a circular polarized wave. More specifically, the polarized signals can include a vertically linear polarized wave, a horizontally linear polarized wave, a right-handed circular polarized wave, and a left-handed circular polarized wave. In this embodiment, the vertically linear polarized wave and the horizontal linear polarized wave resonate by way of example.

The first receiver 120 and the second receiver 170 each receive the specific polarized wave by making the specific polarized wave resonate in the first antenna element 110 and the second antenna element 160. The vertically linear polarized wave and the horizontally linear polarized wave can resonate in the first antenna element 110 and the second antenna element 160, whereas the first receiver 120 and the second receiver 170 receive either the vertically linear polarized wave or the horizontally linear polarized wave and apply the received polarized wave to the channel estimator 130.

The first receiver 120 includes a first signal selector 122 for receiving the specific polarized wave, and a first power comparator 124 for controlling the first signal selector 122 according to a power value of the received specific polarized wave. Similar to the first receiver 120, the second receiver 170 includes a second signal selector 172 for receiving the specific polarized wave, and a second power comparator 174 for controlling the second signal selector 172 according to a power value of the received specific polarized wave. Since the second signal selector 172 and the second power comparator 174 of the second receiver 170 perform the same functions as the first signal selector 122 and the first power comparator 124 of the first receiver 124, only the first signal selector 122 and the first power comparator 124 are described.

The first signal selector 122 includes a first switch 121 for controlling the first antenna element 110 to resonate the vertically linear polarized wave, and a second switch 123 for controlling the first antenna element 110 to resonate the horizontally linear polarized wave. When the first switch 121 is turned on and the second switch 123 is turned off, the first signal selector 122 receives the vertically linear polarized wave. When the first switch 121 is turned off and the second switch 123 is turned on, the first signal selector 122 receives the horizontally linear polarized wave. The first switch 121 and the second switch 123 are turned on or off under the control of the first power comparator 124.

The first power comparator 124 primarily determines whether the signal output from the first signal selector 122 can be recovered or not. In more detail, the first power comparator 124 calculates a Received Signal Strength Indication (RSSI) of the signal output from the first signal selector 122. Next, the first power comparator 124 compares the calculated RSSI with a threshold level of the RSSI (RSSI_th). When the RSSI is greater than the threshold RSSI, the first power comparator 124 applies the received signal to the channel estimator 130.

When the RSSI is smaller than the threshold RSSI, the first power comparator 124 issues a control signal to the first signal selector 122 so that the first signal selector 122 receives the polarized wave of other type. The first power comparator

124 can enhance the signal restoration performance by recovering the received signal of the RSSI greater than the threshold RSSI. The signal of the RSSI greater than the threshold RSSI is restored, rather than the signal of the maximum RSSI. Accordingly, it is unnecessary to discover the maximum RSSI to thus reduce computations of the MIMO antenna system.

The channel estimator 130 estimates a channel matrix H indicative of the channel gain based on the signals output from the first receiver 120 and the second receiver 170. To estimate the channel matrix, the channel estimator 130 may adopt various methods according to the modulation scheme of the transmitted signal. Since the channel estimation methods are well known to one skilled in the art, further descriptions shall be omitted.

The correlation comparator 140 calculates a correlation from the channel state information of the channel matrix output from the channel estimator 130. As the correlation calculating method is well known in the art, further description shall be omitted.

The correlation comparator 140 compares the calculated correlation with a threshold level of the correlation (Corr_th). When the calculated correlation is below the threshold correlation, the correlation comparator 140 applies the estimate value of the transmit signal to the demodulator to demodulate it. By contrast, when the calculated correlation is greater than the threshold correlation, the correlation comparator 140 issues a control signal to the first signal selector 122 so that the first signal selector 122 receives the polarized wave of the other type. The correlation comparator 140 can issue the control signal not only to the first signal selector 122 to select the different polarized wave, but also to the second signal selector 172. To ease the understanding, the descriptions explain the case where the control signal is issued to the first signal selector 122.

In the MIMO antenna system, for the large correlation, it is hard to restore the signal even with the great RSSI of the received signal. Hence, by restoring the signal only when the correlation falls below a certain value, the restoration performance can be enhanced.

Figure 2:
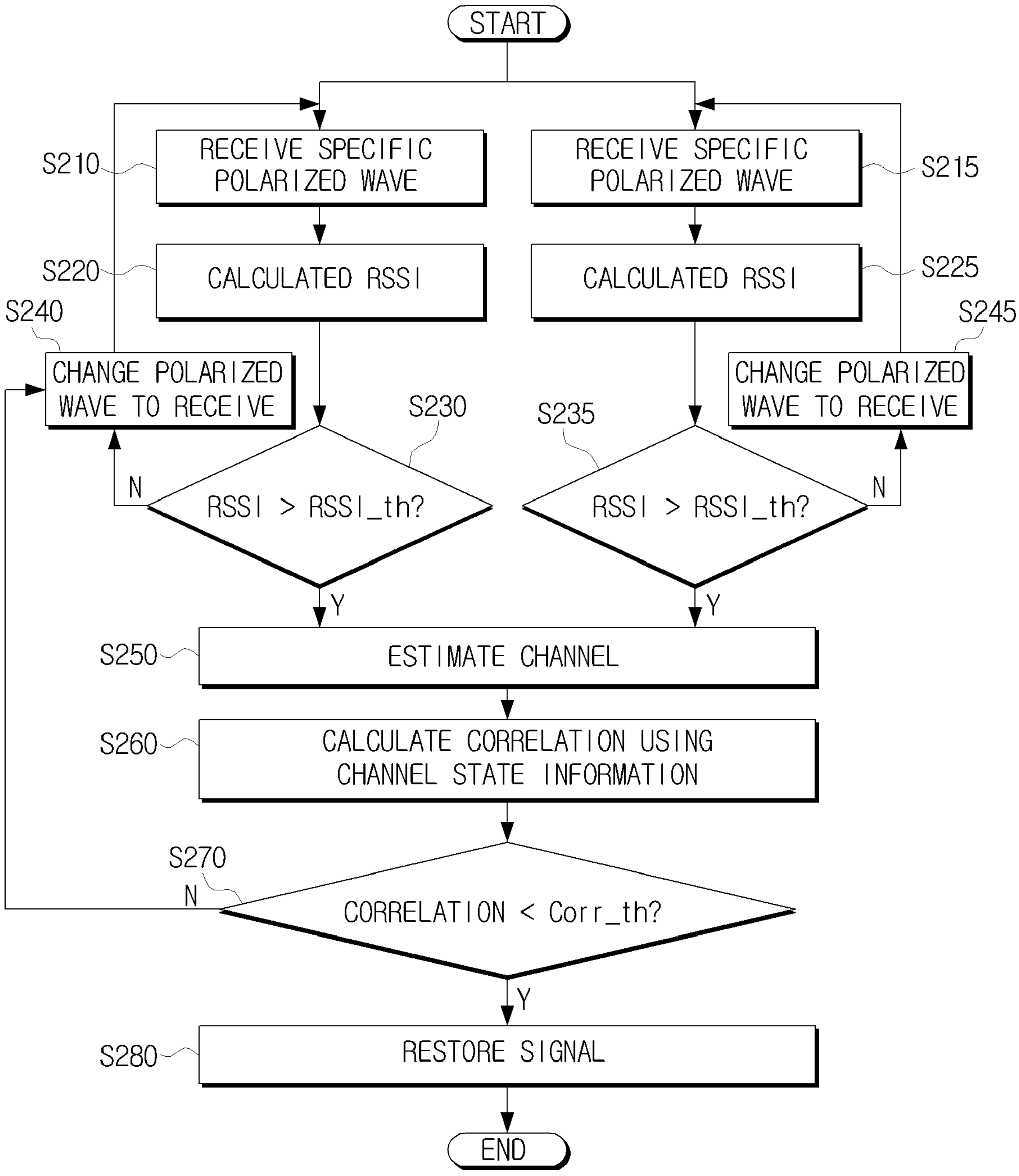
FIG. 2 is a flowchart of a method for receiving and recovering a specific polarized wave adaptable for an environment multiplicity according to an exemplary embodiment.

FIG. 2 is a flowchart of a method for receiving and recovering a specific polarized wave adaptable for an environment multiplicity according to an exemplary embodiment.

The electromagnetic waves of the specific frequency band resonate in the first antenna element 110 and the second antenna element 160, and the first signal selector 122 and the second signal selector 172 each receive the specific polarized wave and apply the received polarized wave to the first power comparator 124 and the second power comparator 174 (S210 and S215). The type of the polarized wave received at the first signal selector 122 is independent of the type of the polarized wave received at the second signal selector 172. In this embodiment, it is assumed that both the first signal selector 122 and the second signal selector 172 receive the linear polarized wave.

The first power comparator 124 and the second power comparator 174 each calculate the RSSI of the received signals provided from the first signal selector 122 and the second signal selector 172 (S220 and S225).

The first power comparator 124 and the second power comparator 174 each determine whether the calculated RSSI exceeds the threshold RSSI (S230 and S235).

When the RSSI falls below the threshold RSSI (S230-N and S235-N), the first power comparator 124 and the second power comparator 174 each issue the control signal instructing to change the polarized wave to receive, to the first signal selector 122 and the second signal selector 172 (S240 and S245).

Since the polarized waves received at the first signal selector 122 and the second signal selector 172 are independent of each other, the RSSI calculated at the first power comparator 124 is also independent of the RSSI calculated at the second power comparator 174. If the RSSI calculated at the first power comparator 124 exceeds the threshold RSSI but the RSSI calculated at the second power comparator 174 falls below the threshold RSSI, only the second power comparator 174 issues the control signal instructing to change the polarized wave to receive to the second signal selector 172. The second signal selector 172 receives and applies the horizontal linear polarized wave, instead of the vertically linear polarized wave, to the second power comparator 174. The second power comparator 174 calculates the RSSI of the horizontal linear polarized wave and determines whether the calculated RSSI exceeds the threshold RSSI. It is assumed that the RSSI of the horizontal linear polarized wave exceeds the threshold RSSI.

By contrast, when the calculated RSSI exceeds the threshold RSSI (S230-Y and S235-Y), the first power comparator 124 and the second power comparator 174 apply the received signal to the channel estimator 130 and the channel estimator 130 estimates the channel using the received signals (S250). The first power comparator 124 determines that the RSSI of the received vertically linear polarized wave exceeds the threshold RSSI and thus applies the vertically linear polarized wave to the channel estimator 130. The second power comparator 174 applies the horizontal linear polarized wave exceeding the threshold RSSI to the channel estimator 130. The channel estimator 130 estimates the channel matrix H indicative of the channel gain using the received signals provided from the first power comparator 124 and the second power comparator 174.

The correlation comparator 140 calculates the correlation using the channel state information of the channel (S260). According to an aspect, the correlation is a spatial correlation.

The correlation comparator 140 determines whether the calculated correlation falls below the threshold correlation (S270). The correlation comparator 140 compares the calculated correlation with the threshold correlation to restore only the signal below the threshold correlation because it is easier to restore the signal with the lower correlation.

When the correlation is below the threshold correlation (S270-Y), the correlation comparator 140 applies the received signal to the restorer 150 and the restorer 150 restores the received signal to the original data using a restoration scheme corresponding to the modulation scheme applied to the transmit signal (S280).

When the correlation exceeds the threshold correlation (S270-N), the correlation comparator 140 issues the control signal instructing to change the polarized wave to receive, to at least one of the first signal selector 122 and the second signal selector 172. When the correlation comparator 140 issues the control signal to the first signal selector 122, the first signal selector 122 receives and provides the horizontally linear polarized wave, instead of the vertically linear polarized wave, to the first power comparator 124. Next, the operations S230 through S270 are performed. When the calculated correlation falls below the threshold correlation (S270), the received signal is recovered.

As above, the first power comparator 124 and the second power comparator 174 receive only the receive signal above the threshold RSSI, and the correlation comparator 140 filters to receive only the receive signal below the threshold correlation. Thus, by restoring the signal using the various polarized signals based on the diverse environments, the performance of the MIMO antenna system can be maximized.

While the receiver restores the signals using the vertically linear polarized wave and the horizontally linear polarized wave, the signal received at the receiver can include a dual linear polarized wave, a right-handed circular polarized wave, and a left-handed circular polarized wave.

In this embodiment, the functions of the first antenna element 110 and the second antenna element 160 are the same as those of the first receiver 120 and the second receiver 170. Even when a variety of the polarized waves is resonated in the first antenna element 120, the second antenna element 160 may be designed to allow the resonation of a specific polarized wave. Even when the first receiver 120 receives a specific one of various polarized waves, the second receiver 170 can receive only a specific polarized wave. The control signal instructing to receive the specific polarized wave is applied only to the first receiver 120.

Now, an antenna element and a signal selector for receiving different polarized waves are described.

Figure 3:
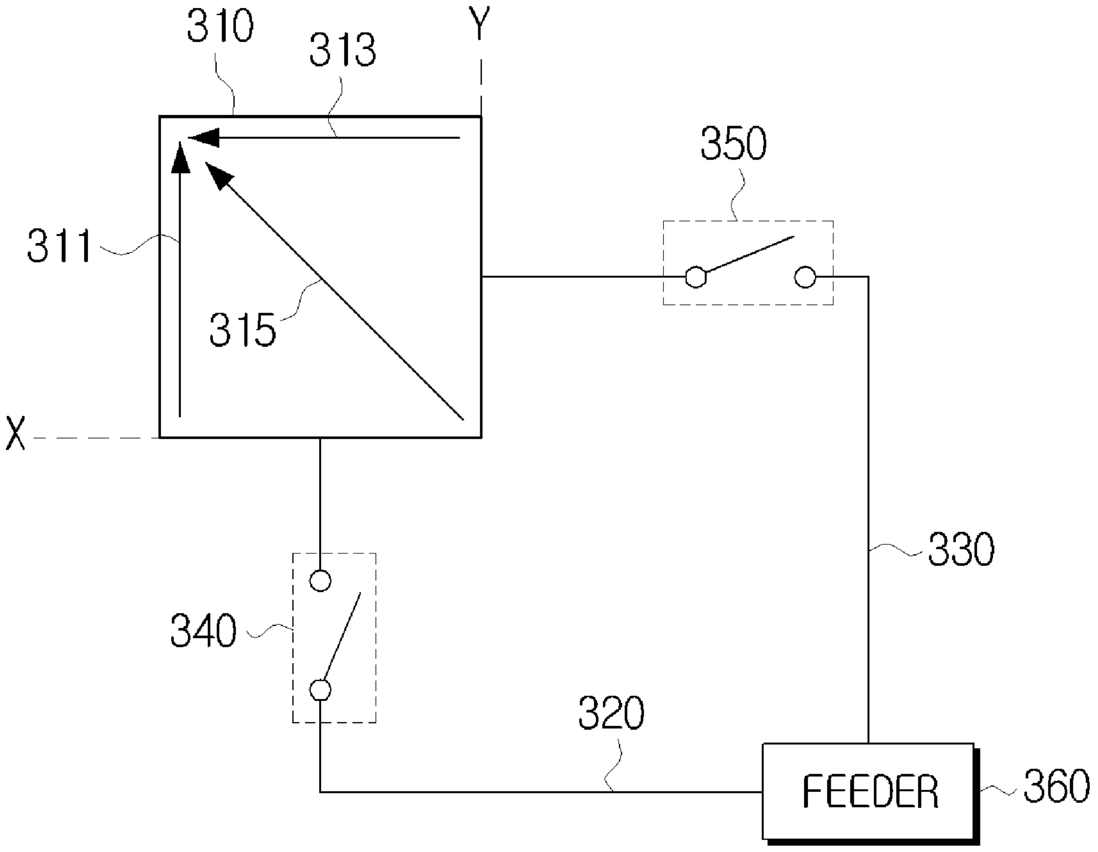
FIG. 3 is a diagram of an antenna element and a signal selector for receiving a different linear polarized wave according to an exemplary embodiment.

FIG. 3 is a diagram of an antenna element and a signal selector for receiving different linear polarized waves according to an exemplary embodiment. Accordingly to an aspect, the antenna element 310 of FIG. 3 is a patch antenna allowing both of a vertically linear polarized wave 311 and a horizontally linear polarized wave 313 to resonate. Particularly, a rectangular patch antenna element may be used. A feeding line includes a first feeding line 320 and a second feeding line 330. One end of the first feeding line 320 is connected to the center of the horizontal side X of the antenna element and the other end is connected to a feeder 360. In the second feeding line 330, one end is connected to the center of the vertical side Y of the antenna element and the other end is connected to the feeder 360. According to another aspect, the feeding line is a strip line.

The first feeding line 320 and the second feeding line 330 include a first switch 340 and a second switch 350 respectively. When the first switch 340 is turned on and the second switch 350 is turned off, the vertically linear polarized wave 311 resonates in the antenna element 310. When the first switch 340 is turned off and the second switch 350 is turned on, the horizontally linear polarized wave 313 resonates in the antenna element 310. When both of the first switch 340 and the second switch 350 are turned on, the dual linear polarized wave 315 resonates in the antenna element.

Figure 4:
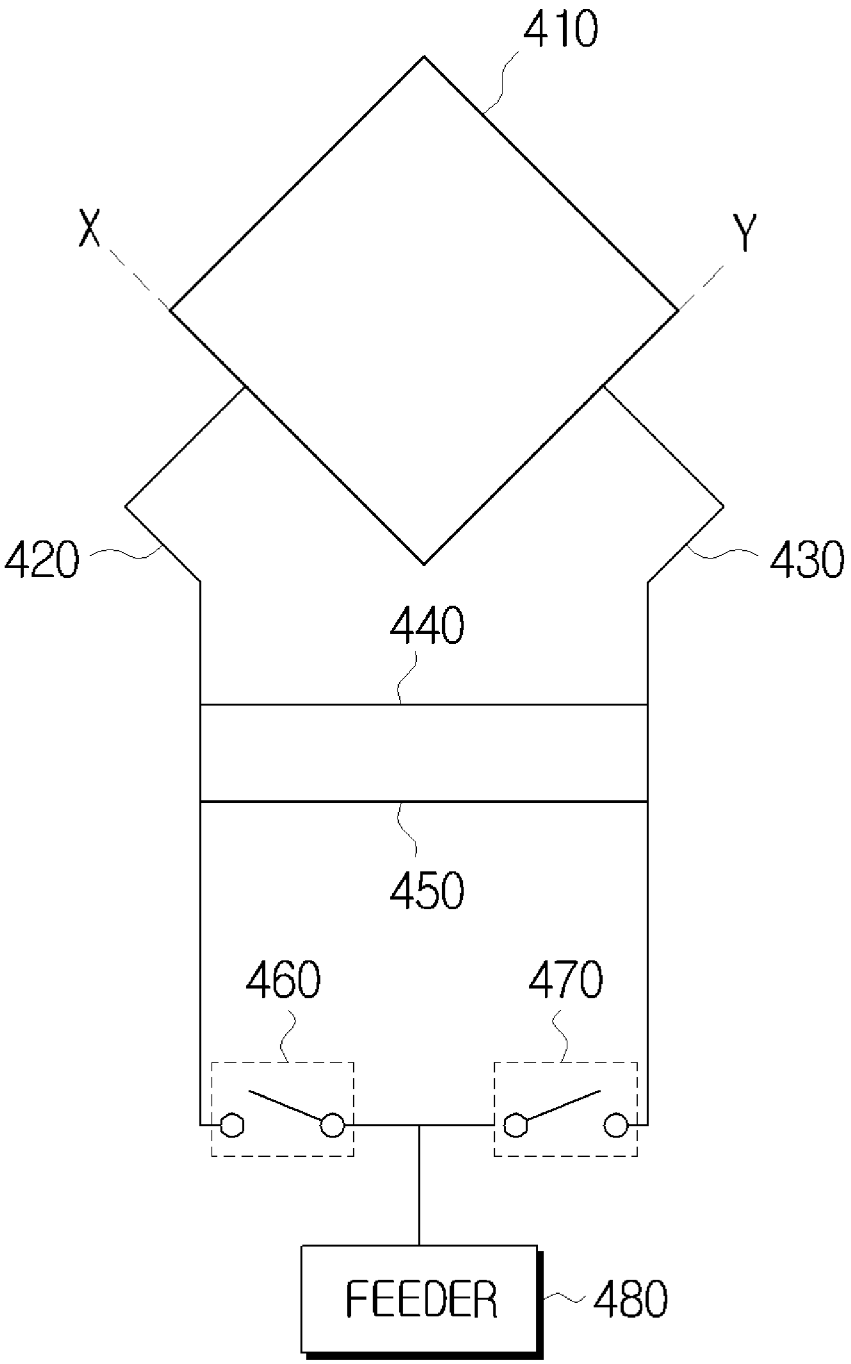
FIG. 4 is a diagram of an antenna element and a signal selector for receiving a different circular polarized wave according to an exemplary embodiment.

FIG. 4 is a diagram of an antenna element and a signal selector for receiving different circular polarized waves according to an exemplary embodiment. The antenna element 410 of FIG. 4 is the same as the antenna element of FIG. 3. A feeding line includes a first feeding line 420 through a fourth feeding line 460. In the first feeding line 420, one end is connected to the center of the horizontal side X of the antenna element and the other end is connected to a feeder 480. In the second feeding line 430, one end is connected to the center of the vertical side Y of the antenna element and the other end is connected to the feeder 480.

In the third feeding line 440, one end is connected to a certain point of the first feeding line 420 and the other end is connected to a certain point of the second feeding line 430. In the fourth feeding line 450, one end is connected to a certain point of the first feeding line 420 and the other end is connected to a certain point of the second feeding line 430. It is advantageous that the third feeding line 440 and the fourth feeding line 450 are arranged in parallel, and that each length of the third feeding line 440 and the fourth feeding line 450 is ¼ of the wavelength with respect to the electromagnetic wave. Hence, the third feeding line 440 and the fourth feeding line 450 function as a phase shifter. The first feeding line 420 and the second feeding line 430 include a first switch 470 and a second switch 480 respectively.

When the first switch 470 is turned on and the second switch 480 is turned off, the signal selector selects the right-handed circular polarized wave. When the first switch 470 is turned off and the second switch 480 is turned on, the signal selector selects the left-handed circular polarized wave.

Figure 5:
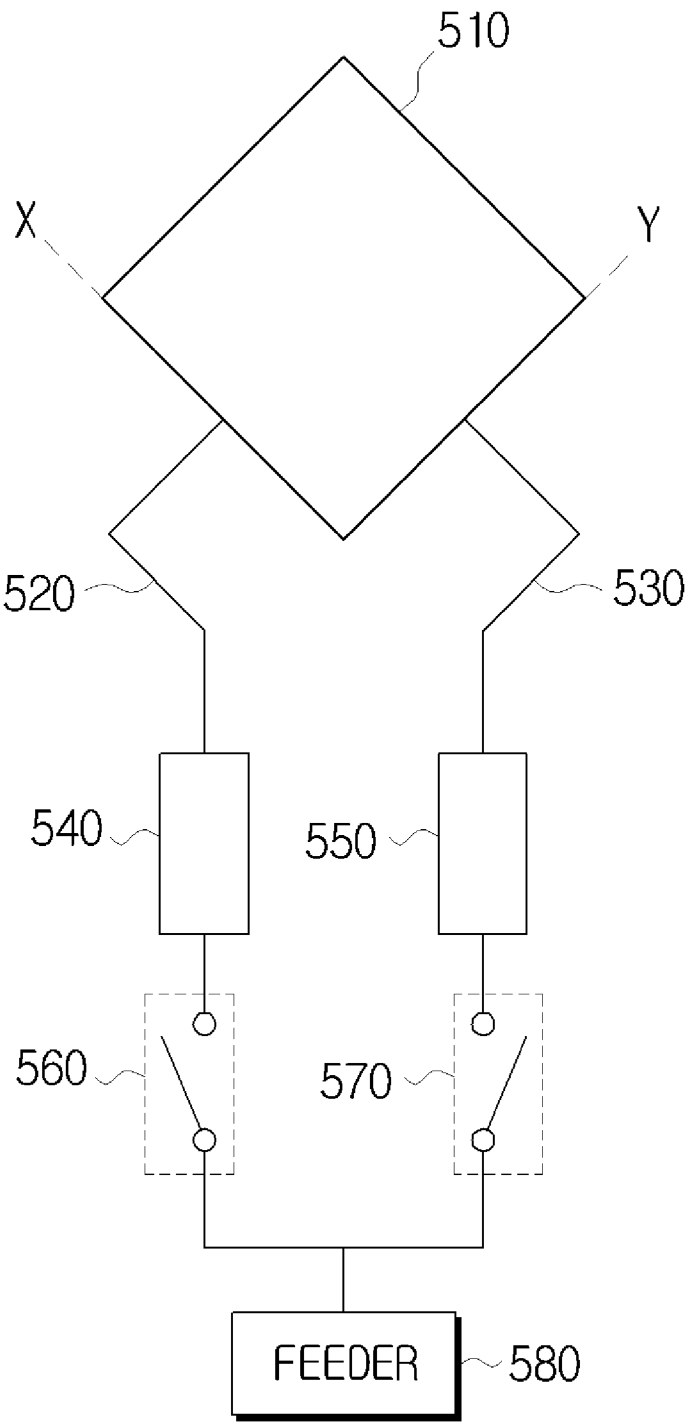
FIG. 5 is a diagram of an antenna element and a signal selector for receiving a linear polarized wave and a circular polarized according to an exemplary embodiment.

FIG. 5 is a diagram of an antenna element and a signal selector for receiving a different linear polarized wave and a different circular polarized wave according to an exemplary embodiment. According to an aspect, the antenna element 510 of FIG. 5 is the same as the antenna element of FIG. 3 and a feeding line includes a first feeding line 520 and a second feeding line 530. In the first feeding line 520, one end is connected to the center of the horizontal side X of the antenna element and the other end is connected to a feeder 580. In the second feeding line 530, one end is connected to the center of the vertical size Y of the antenna element and the other end is connected to the feeder 580.

The first feeding line 520 includes a first phase shifter 540 and a first switch 560. The second feeding line 530 includes a second phase shifter 550 and a second switch 570. The first phase shifter 540 and the second phase shifter 550 alter the phase of the electromagnetic wave resonating in the antenna element 510. In some cases, the first phase shifter 540 and the second phase shifter 550 may not shift the phase of the electromagnetic wave resonating in the antenna element 510. Whether the first phase shifter 540 and the second phase shifter 550 alter the phase of the electromagnetic wave depends on the control signals of the power comparators 124 and 174 and the correlation comparator 140.

For example, when the first phase shifter 540 does not shift the phase of the electromagnetic wave, the first switch 560 is turned on, and the second switch 570 is turned off, the signal selector selects the vertically linear polarized wave. When the second phase shifter 550 does not shift the phase of the electromagnetic wave, the first switch 560 is turned off, and the second switch 570 is turned on, the signal selector selects the horizontally linear polarized wave.

Meanwhile, when both of the first switch 560 and the second switch 570 are turned on, the first phase shifter 540 delays the phase of the electromagnetic wave by 90 degrees, and the second phase shifter 550 does not shift the phase of the electromagnetic wave, the signal selector selects the left-handed circular polarized wave. In contrast, when both of the first switch 560 and the second switch 570 are turned on, the first phase shifter 540 does not shift the phase of the electromagnetic wave, and the second phase shifter 550 delays the phase of the electromagnetic wave by 90 degrees, the signal selector selects the right-handed circular polarized wave.

In this embodiment, the rectangular patch antenna has been illustrated as the antenna element. The shape of the antenna may vary only if the linearly polarized antenna can resonate different linear polarized waves.

Figure 6:
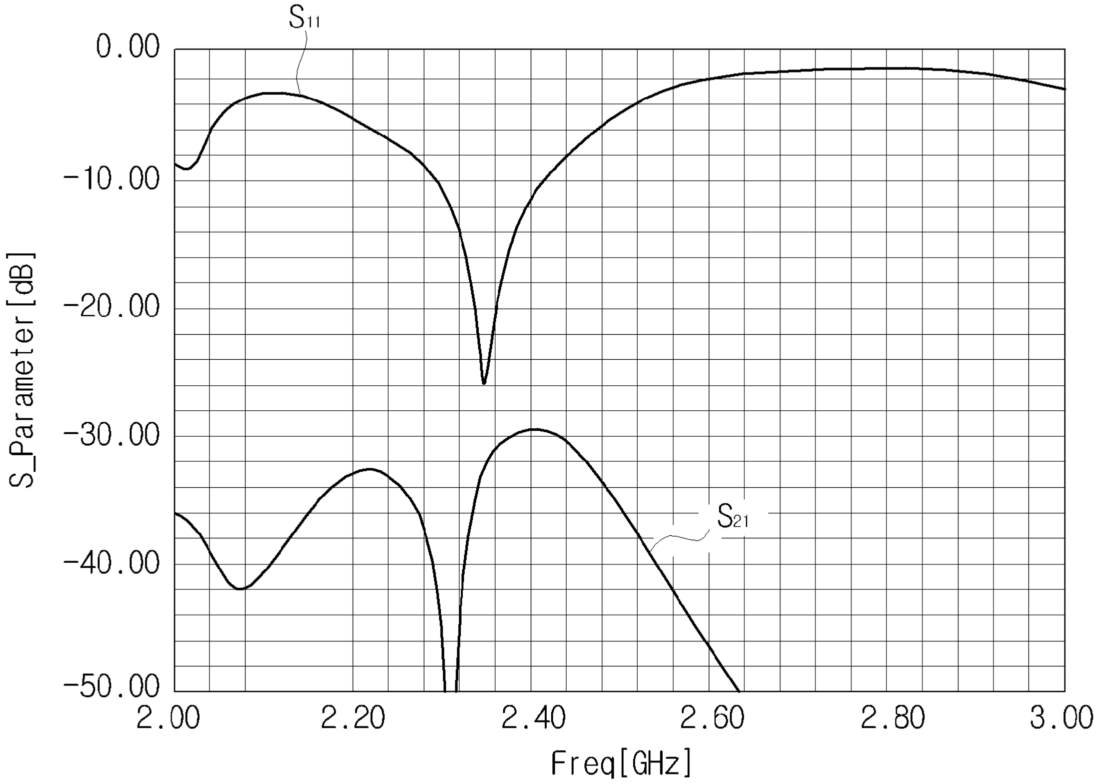
FIG. 6 is a graph of a return loss and an isolation when feeding lines are connected to the center of a horizontal side and the center of a vertical side of a rectangular patch antenna according to an exemplary embodiment.

FIG. 6 is a graph of a return loss and an isolation when feeding lines are connected to the center of a horizontal side and the center of a vertical side of a rectangular patch antenna according to an exemplary embodiment. $S_{11}$ indicates the return loss of the antenna element when the current is supplied through the first feeding line and $S_{21}$ indicates the isolation of the second feeding line when the current is supplied through the first feeding line. As one can see from FIG. 6, when the two feeding lines are connected to the centers of the horizontal side and the vertical side of the linearly polarized antenna, good return loss and good isolation of the resonating electromagnetic wave can be acquired.

According to certain aspects and/or embodiments described above, a restoration performance of a MIMO antenna system may be maximized using a RSSI and the correlation in a multi-path environment.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Multiple Input Multiple Output (MIMO) antenna system, comprising:

a first antenna element;

a second antenna element;

a receiver for receiving at least one of different polarized signals through the first antenna element;

a channel estimator for estimating a channel using a polarized signal received via the receiver and a polarized signal received via the second antenna element; and a correlation comparator for controlling the receiver to receive a specific polarized signal of the different polarized signals according to a correlation calculated from the estimated channel, wherein the receiver comprises a power comparator for controlling to receive a specific polarized signal of the different polarized signals according to a Received Signal Strength Indication (RSSI) of the received polarized signal from the first antenna element, and wherein the power comparator controls the receiver to receive a polarized signal different from the pre-received polarized signal temporally when the RSSI of the received polarized signal is less than a threshold RSSI.

2. The MIMO antenna system of claim 1, wherein, when the correlation calculated from the estimated channel is greater than a threshold correlation, the correlation comparator controls the receiver to receive a polarized signal different from the pre-received polarized signal pre-received at the receiver temporally.

3. The MIMO antenna system of claim 1, wherein the receiver comprises:

a first switch for receiving a first polarized signal among the different polarized signals; and a second switch for receiving a second polarized signal among the different polarized signals, and wherein the correlation comparator controls the receiver to receive one of the first polarized signal and the second polarized signal.

4. The MIMO antenna system of claim 3, wherein the correlation comparator controls the receiver to receive a polarized signal having a lower spatial correlation, among the first polarized signal and the second polarized signal.

5. The MIMO antenna system of claim 4, wherein the first polarized signal is a vertically linear polarized wave and the second polarized signal is a horizontally linear polarized wave.

6. The MIMO antenna system of claim 3, wherein a linearly polarized signal resonates in the first antenna element.

7. The MIMO antenna system of claim 6, wherein the receiver further comprises:

a first feeding line of which one end is connected to a first side of the first antenna element and the other end is connected to a feeder; and a second feeding line of which one end is connected to a second side, which is different from the first side, of the second antenna element and the other end is connected to the feeder, and wherein the first switch is disposed in the first feeding line and the second switch is disposed in the second feeding line.

8. The MIMO antenna system of claim 7, wherein the one end of the first feeding line is disposed at a center of the first side of the first antenna element.

9. The MIMO antenna system of claim 1, wherein the receiver comprises:

a phase shifter for altering a phase of the received polarized signal received through the first antenna element;

a first switch for selecting a first polarized signal; and a second switch for selecting a second polarized signal, and wherein the correlation comparator controls the first switch and the second switch to select a polarized signal of a lower correlation, among the first polarized signal and the second polarized signal.

10. The MIMO antenna system of claim 9, wherein a linearly polarized signal resonates in the first antenna element.

11. The MIMO antenna system of claim 10, further comprising a feeder for supplying a current to the first antenna element, wherein the receiver comprises:

a first feeding line of which one end is connected to a first side of the first antenna element and the other end is connected to the feeder; and a second feeding line of which one end is connected to a second side, which is different from the first side, of the first antenna element and the other end is connected to the feeder, and wherein the first switch is disposed in the first feeding line, the second switch is disposed in the second feeding line, and the phase shifter is disposed along the first feeding line and the second feeding line.

12. The MIMO antenna system of claim 11, wherein the first polarized signal is a left-handed circular polarized signal and the second polarized signal is a right-handed circular polarized signal.

13. The MEMO antenna system of claim 1, wherein the receiver comprises:

a first feeding line having a first end connected to a first side of the first antenna element, and a second end connected to the feeder; and a second feeding line having a first end connected to a second side of the first antenna element that is different from the first side, and a second end connected to the feeder.

14. The MIMO antenna system of claim 13, wherein the first feed line further comprises a first phase shifter and a first switch along the first feed line, and wherein the second feed line further comprises a second phase shifter and a second switch along the second feed line.

15. A method for controlling a MIMO antenna system which comprises a first antenna element and a second antenna element, the method comprising:

receiving a first signal which is at least one of different polarized signals, through the first antenna element;

receiving a second signal through the second antenna element;

estimating a channel using the first signal and the second signal; and firstly controlling to make the first signal be a specific polarized signal based on a correlation calculated from the estimated channel, wherein the receiving the first signal and the receiving the second signal comprise secondly controlling to make the first signal be a specific polarized signal according to a Received Signal Strength Indication (RSSI) of the first signal, and wherein the secondly controlling operation controls to make the first signal be a polarized signal different from a pre-received signal when the RSSI of the pre-received first signal is less than a threshold RSSI.

16. The method of claim 15, wherein the firstly controlling operation controls to make the first signal be a polarized signal different from a pre-received signal when the calculated correlation is greater than a threshold correlation.

* * * * *